United States Patent
Tu et al.

(10) Patent No.: US 7,171,498 B2
(45) Date of Patent: Jan. 30, 2007

(54) ALPHANUMERIC KEYBOARD INPUT SYSTEM USING A GAME CONTROLLER

(75) Inventors: Edgar Allan Tu, Castro Valley, CA (US); Michael Reitmeyer, Pottstown, PA (US); Noam Rimon, Redwood City, CA (US)

(73) Assignee: Sony Computer Entertainment America Inc., Foster City, CA (US)

( * ) Notice: Subject to any disclaimer, the term of this patent is extended or adjusted under 35 U.S.C. 154(b) by 599 days.

(21) Appl. No.: 10/340,440

(22) Filed: Jan. 9, 2003

(65) Prior Publication Data

US 2004/0139254 A1 Jul. 15, 2004

(51) Int. Cl.
G09G 5/36 (2006.01)
G06F 13/00 (2006.01)

(52) U.S. Cl. .............. 710/73; 710/67; 341/22; 345/169; 345/173; 379/433.07

(58) Field of Classification Search ........ 345/156–173, 345/177; 341/22; 379/433.07; 400/489; 710/22, 29, 67, 72–73; 711/4, 114, 133, 711/152, 162; 714/1, 767
See application file for complete search history.

(56) References Cited

U.S. PATENT DOCUMENTS

| | | | |
|---|---|---|---|
| 5,543,818 A | 8/1996 | Scott | 345/168 |
| 5,661,476 A * | 8/1997 | Wang et al. | 341/22 |
| 5,677,710 A * | 10/1997 | Thompson-Rohrlich | 345/173 |
| 5,917,493 A * | 6/1999 | Tan et al. | 715/835 |
| 6,037,942 A * | 3/2000 | Millington | 715/835 |
| 6,256,029 B1 * | 7/2001 | Millington | 715/841 |
| 6,307,549 B1 | 10/2001 | King et al. | 345/352 |
| 6,789,967 B1 * | 9/2004 | Forester | 400/489 |
| 6,801,190 B1 * | 10/2004 | Robinson et al. | 345/173 |
| 6,931,125 B2 * | 8/2005 | Smallwood | 379/433.07 |
| 6,972,748 B1 * | 12/2005 | Lang | 345/160 |
| 2003/0093591 A1 * | 5/2003 | Hohl | 710/22 |
| 2003/0107500 A1 * | 6/2003 | Lee | 341/22 |
| 2003/0184451 A1 * | 10/2003 | Li | 341/22 |
| 2004/0095327 A1 * | 5/2004 | Lo | 345/169 |

FOREIGN PATENT DOCUMENTS

WO WO 00/23870 4/2000

* cited by examiner

Primary Examiner—Christopher Shin
(74) Attorney, Agent, or Firm—Martine Penilla & Gencarella, LLP

(57) ABSTRACT

An invention is provided for an alphanumeric keyboard input system using a controller, such as a game controller. A plurality of cells is provided, where each cell includes a plurality of characters. A user is allowed to select any character using only two commands. In particular, a first command is used to select a particular cell of the plurality of cells, and a second command is used to select a particular character of the plurality of characters within the selected cell.

33 Claims, 8 Drawing Sheets

| | お え あ う い | こ け か く き | そ せ さ す し |
|---|---|---|---|
| を ん わ | と て た つ ち | の ね ぬ な に | ほ へ は ふ ひ |
| | も め ま む み | よ や ゆ | ろ れ ら る り |

FIG. 5

ALPHANUMERIC KEYBOARD INPUT SYSTEM USING A GAME CONTROLLER

BACKGROUND OF THE INVENTION

1. Field of the Invention

This invention relates generally to computer data entry, and more particularly to efficient alphanumeric character entry using an input device, such as a game controller.

2. Description of the Related Art

Since the advent of the home video game, the game controller has become a fixture in homes worldwide. In its typical form, the video game controller constitutes a hand-held base with a joystick or keypad for directional control and a keypad of buttons that perform a variety of functions, such as fire, run, and jump. Games and game consoles have evolved to provide additional utility and interaction. For example, games and game consoles currently allow users to input alphanumeric data to enhance the user experience, such as allowing web browsing email access, and/or to allow the user to personalize games.

Initially, manufacturers provided this functionality by shipping separate keyboard units to users to allow entry of alphanumeric data. These electronic keyboards use a standard QWERTY key arrangement for data entry. The QWERTY key arrangement is used in standard keyboards that contain the letters Q-W-E-R-T-Y beginning at the upper left end of the second row from the top.

FIG. 1 shows a prior art keyboard having a standard QWERTY key arrangement. The layout of the keyboard is divided into four sections: text entry section 10, navigation section 20, numeric keypad section 30, and function key section 40. The text entry section 10 comprises five rows of keys, wherein the first row is composed mainly of numeric keys and punctuation keys, the second through fourth rows are comprised mainly of alphabetical and punctuation keys, and the fifth row is comprised mainly of the space bar. Tab, Caps Lock, Shift, Control, Alt, and Enter keys are generally disposed on the left and right extremities of rows two through five. As mentioned above, the alphabetical keys are arranged in the QWERTY pattern.

The navigation section 20 includes an upper portion comprised of two rows of three navigation and editing keys. These include the Insert, Delete, Home, End, Page Up, and Page Down keys. A lower portion includes arrow keys for controlling the motion of the cursor. Typically, the Up Arrow is disposed singly in a first row and the Left, Down and Right Arrows are disposed together in a second row. The numeric keypad section 30 includes five rows of numeric and mathematical symbol keys with a calculator like arrangement for easy number entry.

Disposed above text entry section 10, navigation section 20, and numeric keypad section 30 is the function key section 40, which comprises a row of function keys. The function key section 40 may also include indicators 45 for displaying whether Num Lock, Caps Lock or Scroll Lock are activated.

Unfortunately, shipping an additional keyboard with a game console increases costs to the manufacturer. Although, the manufacturer could pass the costs on to the customer, the increased game console costs can reduce sales and price the console out of range of many potential customers. In response, manufactures began utilizing an "on-screen" keyboard. An on-screen keyboard is a depiction on a screen of a QWERTY keyboard, which the user can utilize to select various alphanumeric characters. However, on-screen keyboards are slow because the user must select particular keys using a pointing device.

In particular, to generate a single character entry, a user's mind must go through several steps generally not needed using conventional keyboards. First, unlike touch-typing on a conventional keyboard, an on-screen keyboard requires the user to mentally determine where the particular character is on the screen. That is, the user does not have the facilities of touch-typing afforded by a conventional keyboard. Second, the user must determine where they are coming from, that is, which key is currently selected. Third, the user must use the game controller to traverse the keys of the on-screen keyboard to move from the currently selected to key to the desired key on the on-screen keyboard, and fourth, the user must actually select the desired key. That is, the user generally must traverse to the "enter" key on the on-screen keyboard, or use an enter key on the game controller. Hence, this entire process takes much longer to accomplish than required using a conventional keyboard. For example, a sentence that may take a user three seconds to type using a conventional keyboard may take three hundred seconds to write using an on-screen keyboard.

Another arrangement used for alphanumeric data entry is the twelve-button touch-tone telephone keypad arrangement. FIG. 2 is a diagram showing a prior art twelve-button touch-tone telephone keypad arrangement 200. The twelve-button touch-tone telephone keypad arrangement 200 includes twelve keys 202 each having a particular number 204 arranged four high and three wide. In addition, "*" 208 and "#" 210 keys are included next to the "0" key. Twenty-four letters of the alphabet, excluding the "Q" and "Z," are arranged in groups 206 of three characters, located on the faces of the keys 202 numbered "2" through "9." "Q" and "Z" vary in their location on the keypad. For example, the "Q" and "Z" can be located on the "0" key, or included on the "7" and "9" keys.

To generate a particular character using the twelve-button touch-tone telephone keypad arrangement 200, the user must determine which key 202 to press and then determine the number of times to press the key. Specifically, the user may be required to press a particular key 202 numerous times until the proper character is displayed. Typically, the first character of the set of three characters 206 on a particular key 202 will be displayed the first time the key is pressed. Subsequent characters of the set will then be displayed with each subsequent press of the same key 202. For example, to display a "C," the user must press the number "2" key three times, first displaying the letter "A," then the letter "B," followed by the desired character "C." Unfortunately, this method of alphanumeric data entry also increases the time needed to enter data. For example, to enter the word "BOY" using the above data entry method, the user must press the "2" key twice to obtain the "B," the "6" key three times to obtain the "O," and the "9" key three times to obtain the "Y." To increase the speed of data entry, one prior art telephony system utilizes likely words to "guess" the correct character to display on each key press. For example, when the users presses the "2" key, the system displays an "A." Then, when the user presses the "6" key, the system displays an "M" because the most likely word that having two letters that are available on the "2" and "6" keys is "AM." Upon, pressing the "9" key, the entire word changes to "BOY" because the most likely word having three letters that are available on the "2," "6," and "9" keys is "BOY." If this is not the desired word, the user is then allowed to correct the result by selecting other combinations.

In view of the foregoing, there is a need for a method for data entry that does not require the extra costs associate with extra keyboards yet allows fast alphanumeric data entry. The method should allow the user to enter alphanumeric data fast, without having to traverse long tracks of screen objects and without having to repeatedly press keys.

SUMMARY OF THE INVENTION

Broadly speaking, the present invention fills these needs by providing an alphanumeric keyboard input system using an input device, such as game controller. Broadly speaking, embodiments of the present invention allow a user to select a particular character using at most two commands. As such, embodiments of the present invention allow a user to enter data quickly and easily without needing to visually examine an entire list of characters. In one embodiment, a method for character selection is disclosed. The method includes providing a plurality of cells, where each cell includes a plurality of characters. As mentioned above, a user is allowed to select any character using only two commands. In particular, a first command is received to select a particular cell of the plurality of cells, and a second command is received to select a particular character of the plurality of characters within the selected cell. In one aspect, the second command can be received from an input device that includes a plurality of buttons. In this case, a portion of the plurality of buttons can each correspond to a particular character of the plurality of characters within a cell. To facilitate easy selection, a portion of the plurality of cells can be arranged in a three by three grid. In this aspect, a center cell of the three by three grid is selected prior to receiving the first command. In this manner, the first command indicates a move to a cell at most one cell away from the center cell. To allow for larger character sets, the plurality of cells can include at least one side cell that is outside the three by three grid. These side cells can be accessed using a button click as the first command.

A system for character selection is disclosed in an additional embodiment of the present invention. The system includes logic that provides a plurality of cells, where each cell includes a plurality of characters. Further included in the system is an input device having a plurality of controls, which include a plurality of control buttons. Each control button corresponds to a particular character of the plurality of characters within a cell. In use, the input device can transmit a first command to select a particular cell of the plurality of cells, and send a second command using a control button to select a corresponding character of the plurality of characters within the selected cell. As above, a portion of the plurality of cells can be arranged in a three by three grid, with a center cell selected prior to receiving the first command. Thus, the first command indicates a move to a cell at most one cell away from the center cell. As above, the plurality of cells can include at least one side cell outside the three by three grid, which is accessed using a button. Optionally, logic can be included that inserts an estimation extension after each character entered. The estimation extension includes a plurality of characters that forms a word when combined with the characters previously entered. In one aspect, the estimate extension can be generated by examining a sorted list having a plurality of words sorted based on usage frequency. For example, the usage frequency can refer to word occurrence frequency in selected articles. Typically, the selected articles can be related to a particular subject.

In a further embodiment, a computer program embodied on a computer readable medium for character selection is disclosed. The computer program includes program instructions that provide a plurality of cells, with a portion of the plurality of cells being arranged in a three by three grid. As above, each cell includes a plurality of characters. The computer program further includes program instructions that receive a first command to select a particular cell of the plurality of cells, and program instructions that receive a second command to select a particular character of the plurality of characters within the selected cell. In one aspect, the second command can be received from an input device that includes a plurality of control buttons, each control button corresponding to a particular character of the plurality of characters within a cell. Program instructions can also be included for selecting a center cell of the three by three grid prior to receiving the first command, thus the first command can indicate a move to a cell at most one cell away from the center cell. Similar to above, the plurality of cells can further include at least one side cell outside the three by three grid.

Advantageously, embodiments of the present invention can utilize a central starting position cell, which allows the user to always know exactly where the selection cursor will be when starting the data entry process for each character. As a result, the user advantageously can always begin the selection process at most one cell away from the desired cell. Further, because the buttons on the input device correspond to characters within a cell, selection of a specific character is easy and intuitive, allowing character selection without visual analysis of the entire keypad configuration. Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings in which:

FIG. 5 is a diagram showing an on-screen keypad arrangement for a Japanese hiragana character set, in accordance with an embodiment of the present invention;

DETAILED DESCRIPTION OF THE PREFERRED EMBODIMENTS

An invention is disclosed for an alphanumeric keyboard input system using an input device, such as a game controller. Broadly speaking, embodiments of the present invention allow a user to select a particular character using at most two commands. As such, embodiments of the present invention allow a user to enter data quickly and easily without needing to visually examine an entire list of characters. In the following description, numerous specific details are set forth in order to provide a thorough understanding of the present invention. It will be apparent, however, to one skilled in the art that the present invention may be practiced without some or all of these specific details. In other instances, well known process steps have not been described in detail in order not to unnecessarily obscure the present invention.

Figure 1:
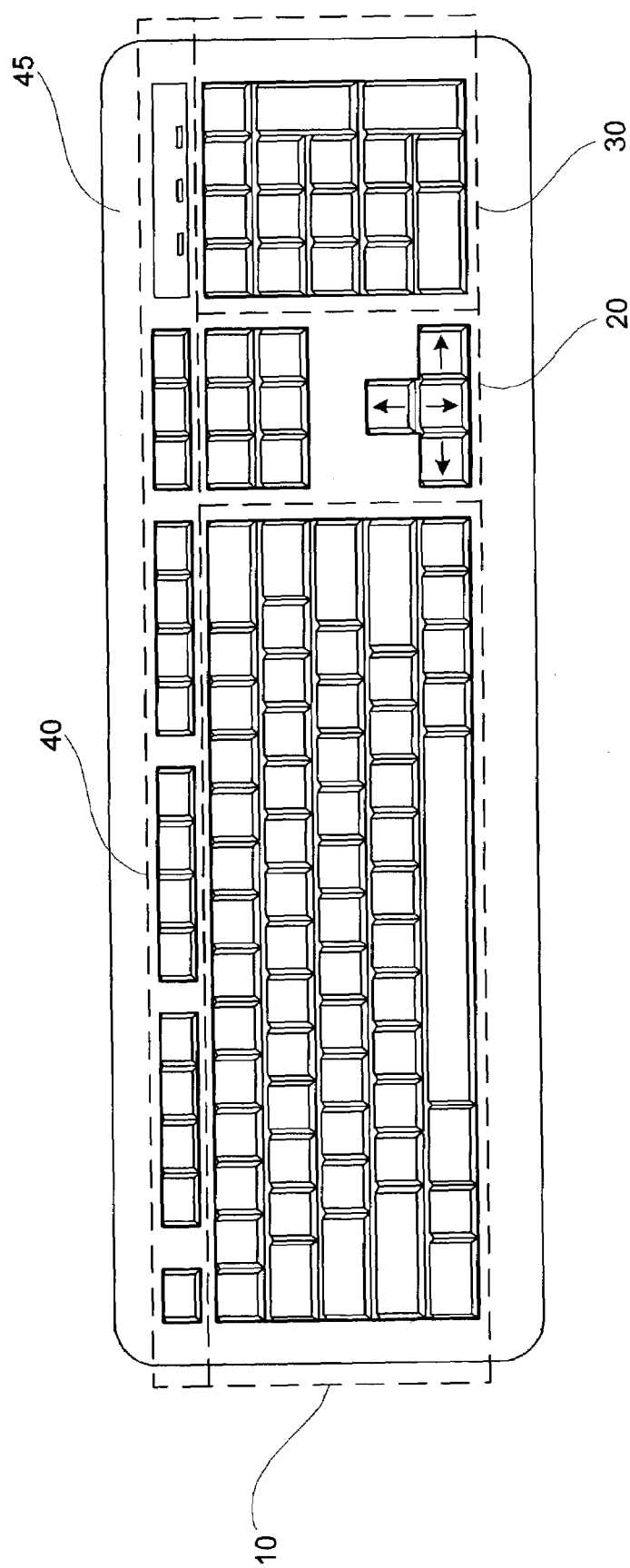
FIG. 1 shows a prior art keyboard having a standard QWERTY key arrangement.
Figure 2:
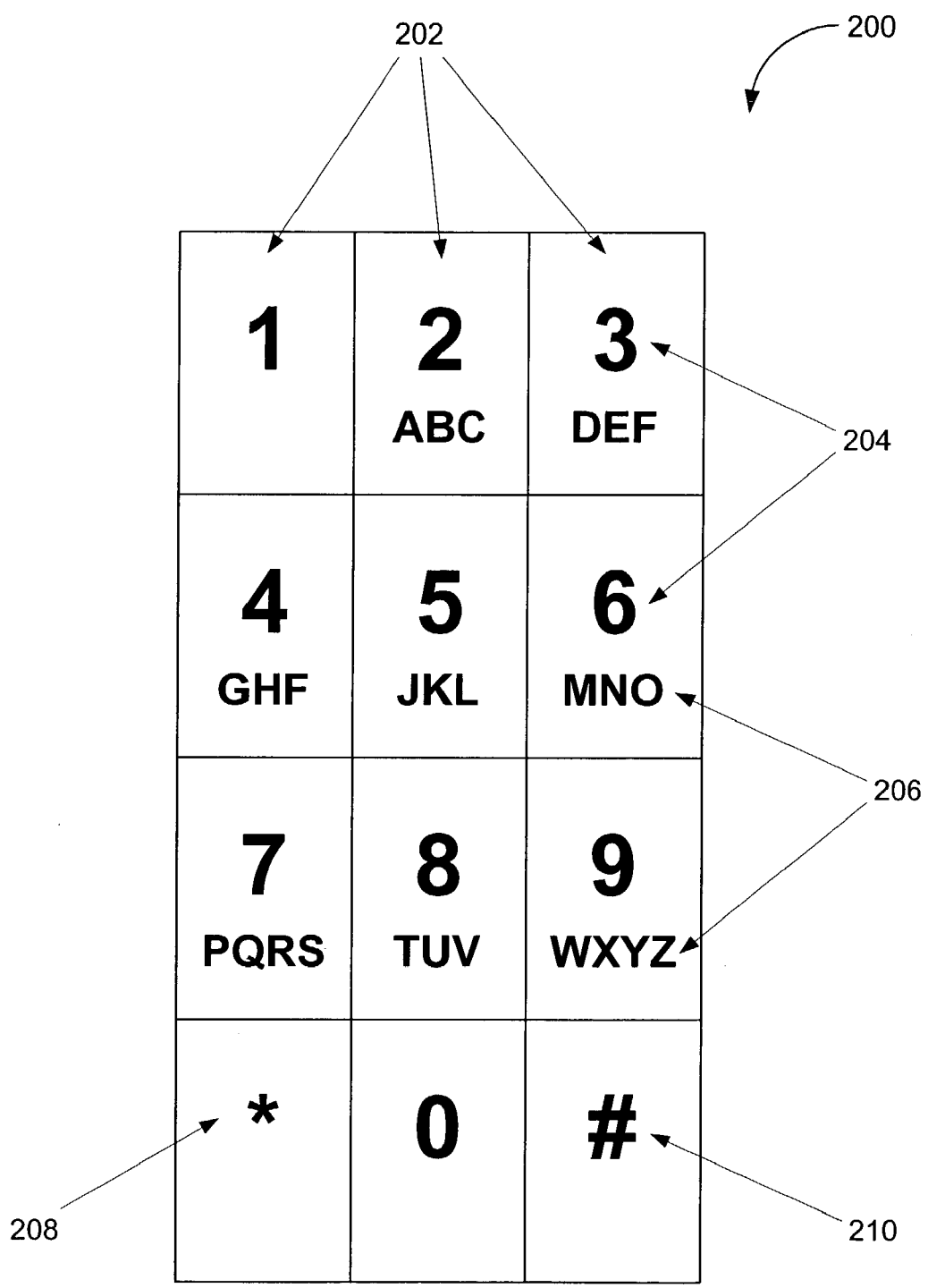
FIG. 2 is a diagram showing a prior art twelve-button touch-tone telephone keypad arrangement.
Figure 3:
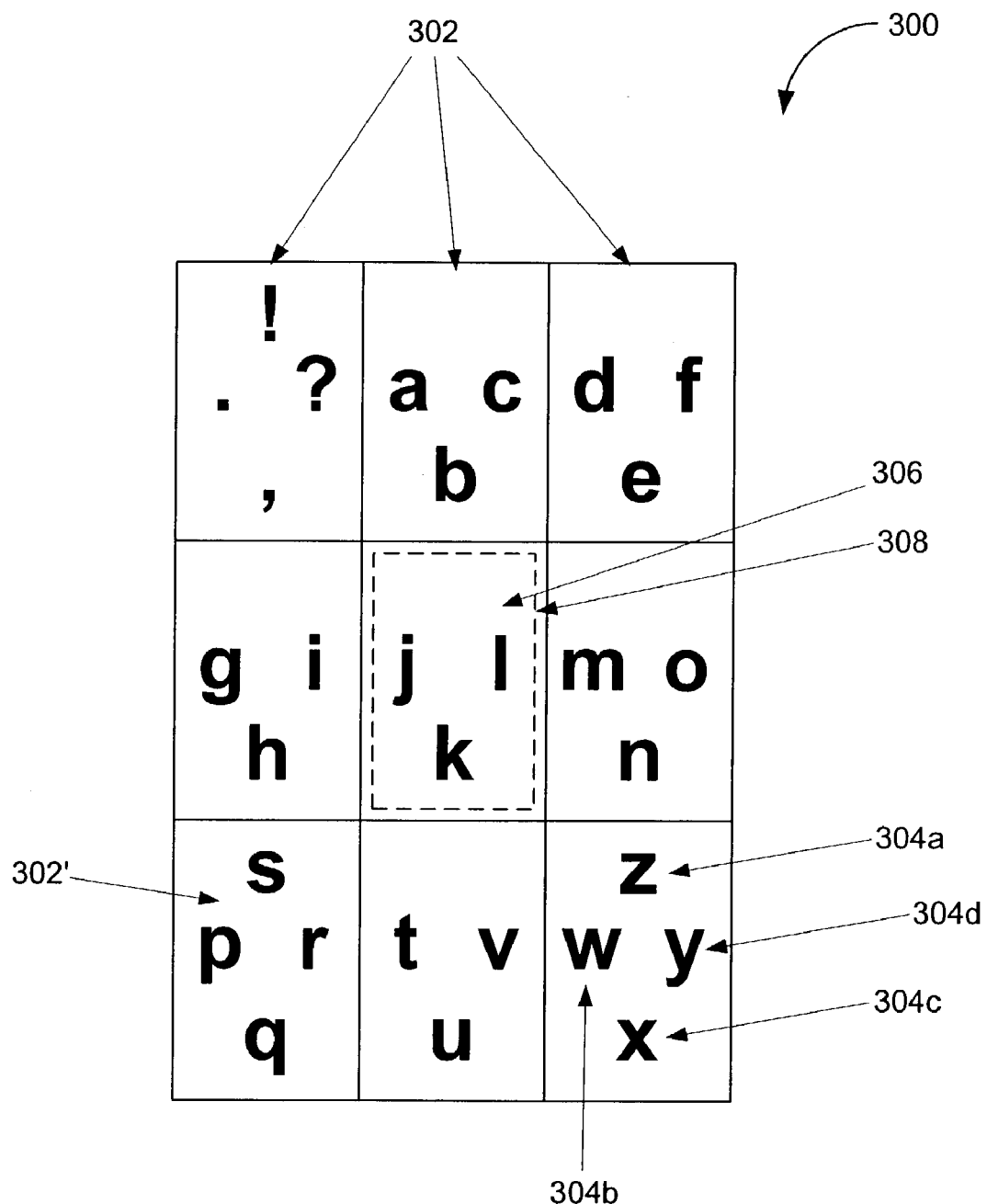
FIG. 3 is a diagram showing an alphanumeric on-screen keypad arrangement, in accordance with an embodiment of the present invention.

FIGS. 1 and 2 were described in terms of the prior art. FIG. 3 is a diagram showing an alphanumeric on-screen keypad arrangement 300, in accordance with an embodiment of the present invention. As shown in FIG. 3, the alphanumeric on-screen keypad arrangement 300 resembles a telephone keypad, which is a familiar sight to most people. In fact, more people are familiar with the layout and use of a telephone keypad than a QWERTY keyboard. The alphanumeric on-screen keypad arrangement 300 includes a plurality of cells 302 configured in a three by three arrangement. Each cell 302 includes a plurality of characters. Although the exemplary alphanumeric on-screen keypad arrangement 300 includes between three to four characters per cell, it should be noted that the number of characters per cell 302 can vary depending on the application and character set used.

Using a cell/character selection paradigm, embodiments of the present invention address the problems of the prior art. That is, embodiments of the present invention address the problems of knowing the starting position of the selection element, finding where the desired key is located, traversing to the desired key, and requiring multiple "clicks" to obtain the desired character.

One embodiment of the present invention addresses the starting position issue by locating the starting position in a central starting position cell 306. As can be appreciated, having the starting position in the central starting position cell 306 allows the user to always know where the selection cursor 308 is before selecting a new character. In addition, as will be described in greater detail below, the central starting position cell 306 is at most one "click" or movement away from the desired cell. However, there may be occasions when it is useful to allow the starting position to remain at the last selected cell. Hence, one embodiment of the present invention locates the starting position for the next character entry at the last selected cell.

Figure 4:
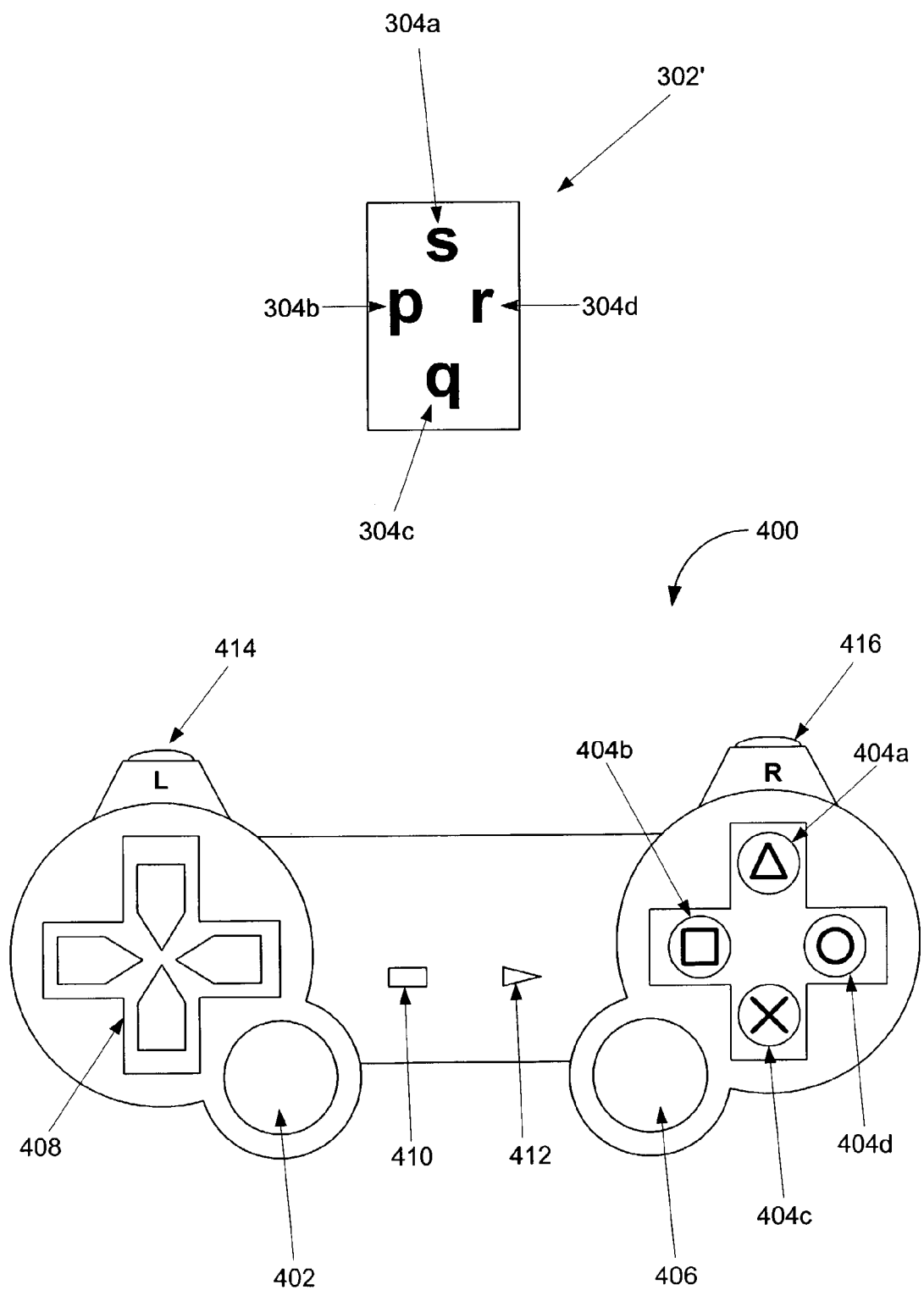
FIG. 4 is an illustration of an exemplary game controller.

Selection of a particular character is performed using an input device, such as a game controller. FIG. 4 is an illustration of an exemplary game controller 400. The exemplary game controller 400 includes a joystick 402 and a plurality of selection buttons 404a–404d. Also included on the exemplary game controller 400 is a second joystick 406, a plurality of directional control buttons 408, a "select" button 410, and a "start" button 412. Additional buttons also may be present on the game controller 400, such as an "L1" button 414 and an "R1" button 416. Further control is provided by allowing the joysticks 402 and 406 to be depressed, thus functioning as "L3" and "R3" buttons respectively.

Embodiments of the present invention utilize the joystick 402 and the selection buttons 404a–404d to select alphanumeric characters for data entry. It should be noted that the other game controller configurations can be utilized with the embodiments of the present invention. In addition, the key usage described in the present description can be varied, yet still fit within the spirit and scopre of the present invention. For example, the diretional control buttons 408 can be utilized in lieu of, or in addition to, the joystick 402. Moreover, embodiments of the present invention can be utilized with any kind of input device. For example, embodiments of the present invention can be utilized with cell phones, personal digital assistants, car navigation systems, and audio/video players, such as CD players, MD players, and DVD players.

Referring back to FIG. 3, the user selects a particular cell 302 by moving the joystick 402 in the direction of the desired cell 302. In one embodiment, when the joystick 402 is at rest, the selection cursor returns to the central starting position cell 306. Hence, because all the cells 302 are at most one cell 302 away from the central starting position cell 306, the user advantageously begins the selection process at most one cell 302 away from the desired cell 302. However, in an additional embodiment, the selection cursor does not return to the central starting position cell 306 when the joystick is at rest. In this manner, a user can operate the input device with one hand. That is, the user can first select the desired cell, then release the joystick, and thereafter select the desired character within the cell as described below. This configuration can be advantageous for users unfamiliar with the input device, wherein the users may have difficulty performing two commands together.

The characters in each cell are positioned to correspond to the positions of the selection buttons on the game controller. For the exemplary game controller 400 illustrated in FIG. 4, the characters within each cell 302 are positioned to match the locations of the selection buttons 404a–404d. Referring to FIG. 3, for example, each cell 302 includes a top character position 304a corresponding to selection button 404a of FIG. 4 and a bottom character position 304c corresponding to selection button 404c of FIG. 4. Similarly, each cell 302 includes a left character position 304b corresponding to selection button 404b of FIG. 4 and a right character position 304d corresponding to selection button 404d of FIG. 4.

Hence, to select the character "r" the user first positions the selection cursor over the lower left cell 302', thereby indicating that the selection buttons 404a–404d of the game controller 400 will correspond to the characters "p," "q," "r," and "s." In particular, when cell 302' is selected, selection button 404a will correspond to the "s" character position 304a and selection button 404b will correspond to the "p" character position 304b. In addition, selection button 404c will correspond to the "q" character position 304c and selection button 404d will correspond to the "r" character position 304d. Continuing with the above example, once the cell 302' is selected, the user depresses selection button 404d, which corresponds to the "r" character position 304d, to select the "r" character. When a character position does not include a character, selecting the character position will insert a "space" character. For example, in the cell 302 having the characters "a," "b," "c," selecting selection button 404a will select the top character position, which in this case is a "space" character.

As described above, conventional on-screen keyboards required the user to physically see a depiction of the entire keyboard on the screen for the user to properly enter data. This is because the user is required to visually identify where their starting position is on the on-screen keyboard. Advantageously, embodiments of the present invention utilize the central starting position cell 306, which allows the user to always know exactly where the selection cursor will be when starting the data entry process for each character.

In addition, the user must determine which controller moves are necessary to traverse to the desired key when using a conventional on-screen keyboard, which further requires visual analysis. Using the embodiments of the present invention, the user advantageously is always one "click" or move away from the desired cell. For example, using the exemplary on-screen keypad arrangement 300 illustrated in FIG. 3, each cell 302 is at most one cell away from the starting position cell 306. Hence, embodiments of the present invention allow the user to enter data by touch, without physically viewing the entire on-screen keypad arrangement 300 on the screen, as will be described in greater detail below.

In addition to the character set illustrated in FIG. 3, embodiments of the present invention allow other characters to be accessed and utilized. For example, different character sets can be accessed by pressing a particular key on the game controller, such as the select key 410. With each key press of the select key 410, the specific characters available within each cell 302 can be changed. In this manner, the user can, for example, use the select key 410 to change a lower case character set to an upper case character set, or to a numerical character set. Although the above description is in terms of the select key 410, it should be noted that any means can be utilized to select different character sets. For example, other keys of the game controller, and/or controls located on the game console can be used for character set selection.

It should be further noted that the alphanumeric on-screen keypad arrangement of the embodiments of the present invention is not limited to a three by three grid as illustrated in FIG. 3. That is, additional cells can be added, for example, to facilitate character sets having more than twenty-six characters. For example, FIG. 5 is a diagram showing an on-screen keypad arrangement 500 for a Japanese hiragana character set, in accordance with an embodiment of the present invention. Similar to above, the on screen keypad arrangement 500 includes a plurality of cells 302 configured in a three by three arrangement. In addition, side cell 302" is included to one side of the three by three grid arrangement. Each cell 302 includes a plurality of hiragana characters. Although the exemplary alphanumeric on-screen keypad arrangement 500 includes between three to five characters per cell, it should again be noted that the number of characters per cell 302 can vary depending on the application and character set used.

Similar to FIG. 3, the starting position for the selection cursor is located in a central starting position cell 306. As mentioned above, having the starting position in the central starting position cell 306 allows the user to always know where the selection cursor is before selecting a new character. In addition, the central starting position cell 306 is at most one "click" or movement away from the desired cell.

The Japanese hiragana character set includes forty-six characters. To fully accommodate the full character set, embodiments of the present invention utilize the side cell 302". Since the side cell 302" is outside the three by three grid, a button press can be used to access the side cell 302" instead of joystick directional movement. For example, one embodiment utilizes the "L3" button to access the side cell 302". As mentioned above, depressing joystick 402 on the game controller 400 actuates the "L3" button. As above, it should be noted that any mechanism can be utilized to access the side cell 302". Preferably, the side cell 302" is accessed using a button or other single movement. In this manner, the user does not have to visually examine the keypad arrangement 500 to find a particular cell.

As above, selection of a particular character is performed using the game controller. The user selects a particular cell 302 by moving the joystick 402 in the direction of the desired cell 302. To select the side cell 302", in the example of FIG. 5, the user presses the "L3" button on the game controller 400. When the joystick 402 is at rest, the selection cursor returns to the central starting position cell 306. Hence, because all the cells 302 are at most one cell 302, or one "click" of the "L3" button, away from the central starting position cell 306, the user advantageously is always begins the selection process at most one cell 302, or one "click," away from the desired cell 302.

Also as above, the characters in each cell are positioned to correspond to the positions of the selection buttons on the game controller. In the example of FIG. 5, the characters within each cell 302/302" are positioned to match the locations of the selection buttons 404*a*–404*d* and "R1" 416 of the game controller 400. Referring to FIG. 5, for example, each cell 302/302" includes a first top character position 516 corresponding to the "R1" button, a second top character position 304*a* corresponding to selection button 404*a* of FIG. 4, and a bottom character position 304*c* corresponding to selection button 404*c* of FIG. 4. Similarly, each cell 302/302" includes a left character position 304*b* corresponding to selection button 404*b* of FIG. 4 and a right character position 304*d* corresponding to selection button 404*d* of FIG. 4. Although FIG. 5 illustrates using a single side cell 302", it should be noted that any number of side cells can be utilized to accommodate characters with the embodiments of the present invention.

As mentioned above, a user generally is not required to view the entire on-screen keypad arrangement on the screen to enter alphanumeric characters using the embodiments of the present invention. As a result, screen space can be saved and/or utilized to display other information or graphics. For example, FIG. 6A is an illustration showing a method for entering alphanumeric characters using a single cell 302', in accordance with an embodiment of the present invention.

Figure 6A:
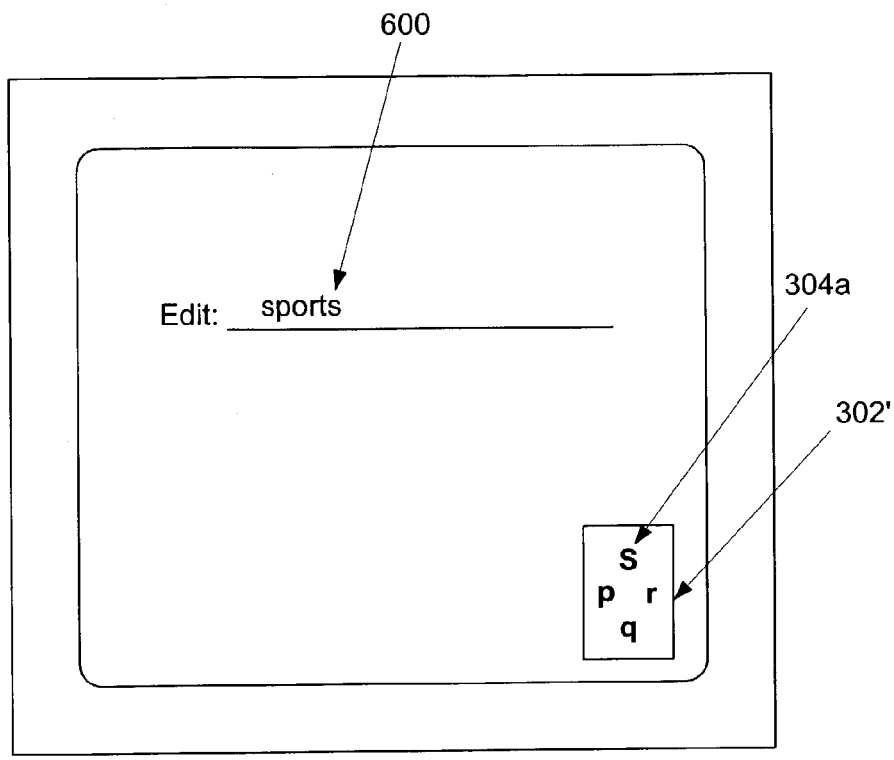
FIG. 6A is an illustration showing a method for entering alphanumeric characters using a single cell, in accordance with an embodiment of the present invention.

In the example of FIG. 6A, a user is entering the word "sports" into the computer system. Having a rudimentary knowledge of the keypad layout 300 of FIG. 3, the user can determine which direction to move the joystick to obtain the appropriate cell having the desired next character. For example, referring back to FIG. 3, cell 302' includes the character "s." Since cell 302' is located diagonally left and below of the central position cell 306, the user moves the joystick 402 of the game controller 402 diagonally left and below to select cell 302'.

With this in mind, referring back to FIG. 6A, the user can move the joystick of the game controller diagonally left and below to select cell 302', which is displayed for example at the lower right corner of the screen. In this manner, only the selected cell 302' is displayed on the screen at any particular time. Thus, to enter the character "s" at location 600 on the computer screen, the user moves the joystick diagonally left and below to select cell 302', which is then displayed for example at the lower right corner of the screen. The user then presses key 404*a* on the game controller 400, which selects the top character position 304*a* of cell 302', which is the character "s."

Figure 6B:
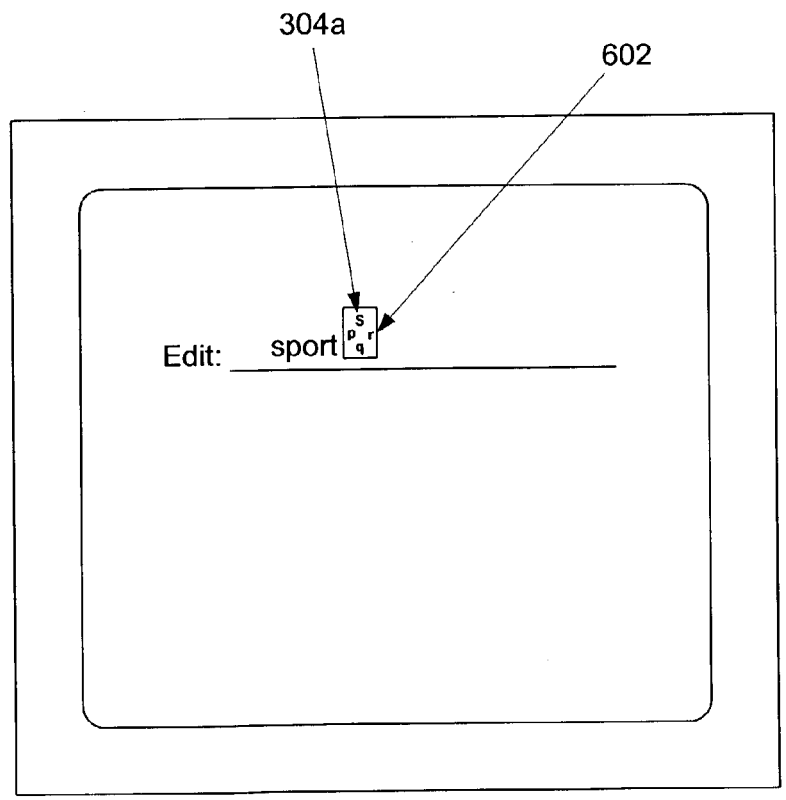
FIG. 6B is an illustration showing a further method for entering alphanumeric characters using a cell cursor, in accordance with an embodiment of the present invention.

FIG. 6B is an illustration showing a further method for entering alphanumeric characters using a cell cursor 602, in accordance with an embodiment of the present invention.

Similar to above, the example of FIG. 6B illustrates a user entering the word "sports" into the computer system. As described previously, with a rudimentary knowledge of the keypad layout 300 of FIG. 3, the user can determine which direction to move the joystick to obtain the appropriate cell having the desired next character. The cell cursor 602 is utilized both as a cursor to indicate the position of the next character in the text on screen, and as a display of the currently selected cell 302.

Thus, the user can move the joystick of the game controller diagonally left and below to select cell 302' of FIG. 3, which is displayed on the cell cursor 602. In this manner, only the selected cell 302' is displayed on the cell cursor 602 at any particular time. As above, to enter the character "s" at location at the end of the word "sport" in FIG. 6B, the user moves the joystick diagonally left and below to select cell 302', which is then displayed on the cell cursor 602. The user then presses key 404a on the game controller 400, which selects the top character position 304a of the cursor cell 602, which is the character "s." In this manner, the user can focus attention on the location where the data they are entering is located, while still having visual confirmation of which character will be displayed with each key 404a–404d press on the game controller 400.

To further assist in efficient data entry, embodiments of the present invention can perform dictionary-based word completion. However, unlike conventional dictionary-based word completion, embodiments of the present invention utilize user specific data programming to better estimate the correct word completion. By way of background, conventional dictionary-based word completion uses an ordinary dictionary to complete words based on the characters already entered into the system, typically in alphabetical order. For example, when a user enters an "a," a conventional dictionary-based word completion system may attempt to complete the word by printing out the next word in the dictionary alphabetically. That is, if "ace" is the next word alphabetically in the dictionary, the conventional dictionary-based word completion system will add the letters "ce" to the letter "a."

Figure 7:
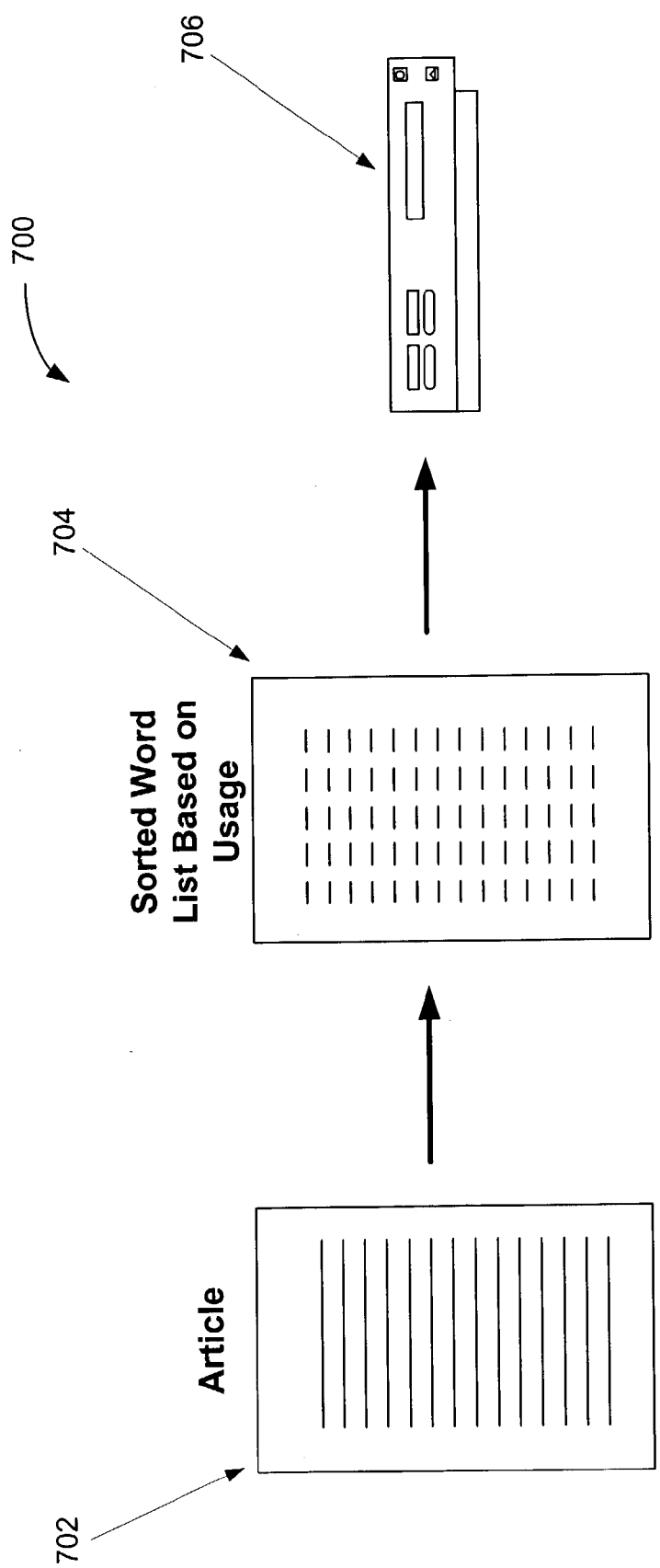
FIG. 7 is an illustration showing a method for using user specific data programming for word completion, in accordance with an embodiment of the present invention.

However, unlike conventional dictionary-based word completion systems, embodiments of the present invention program the completion system with words having a higher likelihood of being correct based on the particular user. FIG. 7 is an illustration showing a method 700 for using user specific data programming for word completion, in accordance with an embodiment of the present invention. As shown in FIG. 7, instead of using an alphabetically ordered dictionary, embodiments of the present invention utilize articles 702 written by human writers as the bases for programming. In particular, embodiments of the present invention obtain articles and/or word lists regarding fields related to the user of the software on the game console 706. For example, if sports software is to be executed on the game console 706, articles regarding sports can be analyzed.

The articles and/or word lists can be associated with software, such as game software, obtained via a network connection such as the Internet, or by any other means appropriate to the specific application. Further, when obtaining articles and/or word lists using a network connection, the articles and/or word lists can be stored, for example, using a memory card, hard drive, or other computer storage device. In this manner, the user can specify particular stored articles and word lists to utilize when inputting data using the embodiments of the present invention. Further, the articles and word lists can be selected automatically based on the user's preferences, actions, or other indicators.

Once an article 702 is obtained, the article 702 is analyzed to determine the frequency with which various words are used. The words then are sorted into a list 704 based on the usage frequency. Generally, the method 700 orders words in a different order than a dictionary. For example, many article writers use the word "but" far more than they use the word "bay." As a result, the sorted word list 704 of the embodiments of the present invention generally would list the word "but" before the word "bay," even though "bay" comes before "but" alphabetically. The sorted word list 704 can then be used for word completion in the game console 706.

Figure 8A:
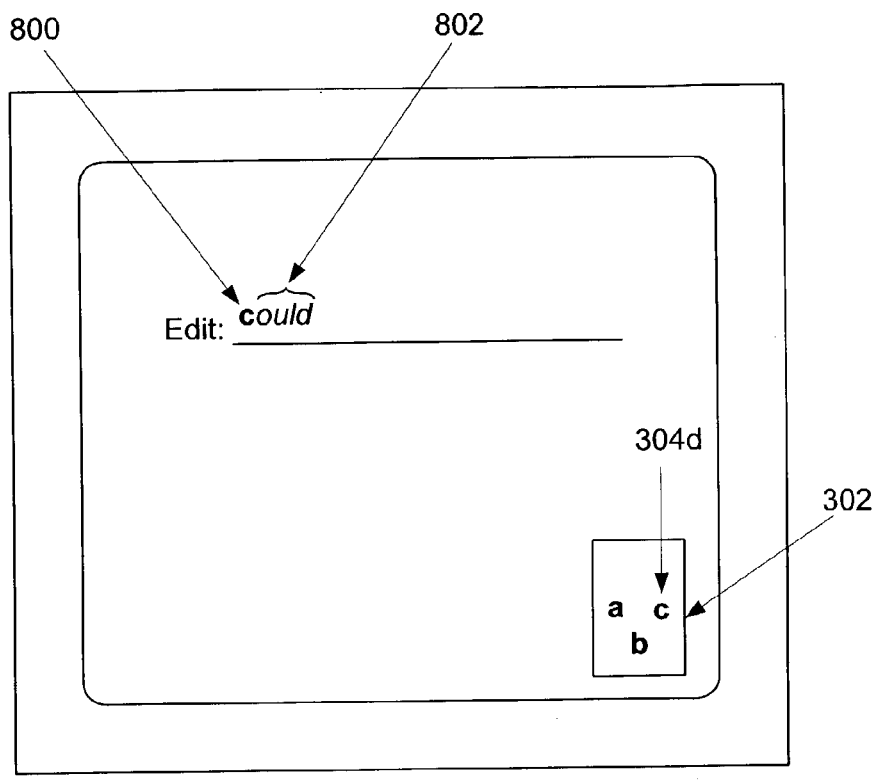
FIGS. 8A and 8B illustrate word completion using user specific data programming, in accordance with an embodiment of the present invention.
Figure 8B:
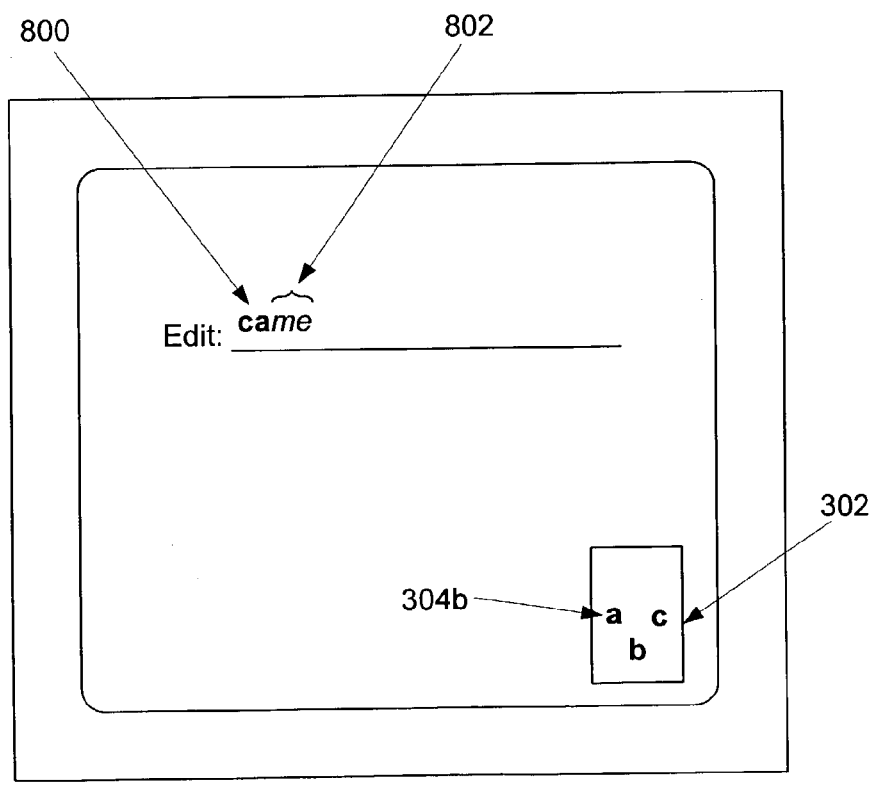

FIGS. 8A and 8B illustrate word completion using user specific data programming, in accordance with an embodiment of the present invention. As shown in FIG. 8A, once a user enters a character embodiments of the present invention estimate the entire word based on the sorted word list 704 of FIG. 7. For example, in FIG. 8A the user enters the character "c" by moving the joystick of the game controller upward to select the cell 302 having the characters "a," "b," and "c," and then pressing key 404d on the game controller. In response, the systems inserts an estimation extension 802 after the letter "c" by examining the sorted word list 704 of FIG. 7 to determine the first listed word starting with the character "c." In this example, the first listed word is "could," thus the system inserts the estimation extension 802 comprised of the letters "ould" after the letter "c." One embodiment also allows the user to search through the sorted list by pressing a particular key on the game controller. With each key press the system displays the next word on of the sorted list 704 that could complete the word. However, once the user enters a new character, the system inserts a new estimation extension, as shown in FIG. 8B.

As shown in FIG. 8B, once a user enters a new character embodiments of the present invention estimate the entire word based on the combination of the characters entered by the user and the sorted word list 704 of FIG. 7. For example, in FIG. 8B the user enters the character "a" after the character "c" by moving the joystick of the game controller upward to select the cell 302 having the characters "a," "b," and "c," and then pressing key 404b on the game controller. In response, the systems inserts a new estimation extension 802 after the letters "ca" by examining the sorted word list 704 of FIG. 7 to determine the first listed word starting with the characters "ca." In this example, the first listed word is "came," thus the system inserts the estimation extension 802 comprised of the letters "me" after the letters "ca." Again, one embodiment can allow the user to search through the sorted list by pressing a particular key on the game controller. Of course, it should be appreciated that the new estimation extension 802 can be the same as the prior estimation extension if the user enters a character that still fulfils the prior extension. This continues for each subsequent character the user enters. In this manner, embodiments of the present invention increase data entry efficiency, thus allowing faster and more accurate data entry.

In addition, embodiments of the present invention further customize the sorted list to a particular user by updating the sorted list 704 based on what the user enters. That is, the system also records the frequency with which the particular user utilizes words. For example, if a particular user uses the word "same" often, embodiments of the present invention will increase the frequency status of the word "same" in the sorted list. If the word "same" is utilized more than a higher ordered word on the sorted list, the sorted list is modified to list the word "same" higher than its current position.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

The invention claimed is:

1. A method for character selection, comprising the operations of:
  providing a plurality of cells, each cell including a plurality of characters;
  receiving a first command to select a particular cell of the plurality of cells, the first command being initiated through a directional control that enables the selection of the particular cell; and
  receiving a second command to select a particular character of the plurality of characters within the selected cell, the second command being initiated by a specific button of a set of buttons, each of the set of buttons corresponds to specific ones of the plurality of characters contained within the selected cell so that the second command that is initiated by the specific button defines the selection of one character;
  whereby the directional control is different from the set of buttons.

2. A method as recited in claim 1, wherein the second command is received from an input device that includes the set of buttons.

3. A method as recited in claim 1, wherein a portion of the plurality of cells are arranged in a three by three grid.

4. A method for character selection, comprising the operations of:
  providing a plurality of cells, each cell including a plurality of characters;
  receiving a first command to select a particular cell of the plurality of cells, the first command being initiated through a directional control that enables the selection of the particular cell; and
  receiving a second command to select a particular character of the plurality of characters within the selected cell, the second command being initiated by a specific button of a set of buttons, each of the set of buttons corresponding to specific ones of the plurality of characters within the selected cell so that the second command that is initiated by the specific button defines the selection of one character;
  selecting a center cell of a three by three grid prior to receiving the first command;
  whereby the directional control is a separate control from the set of buttons.

5. A method as recited in claim 4, wherein the first command indicates a move to a cell at most one cell away from the center cell.

6. A method as recited in claim 3, wherein the plurality of cells further includes at least one side cell, the side cell being outside the three by three grid.

7. A method as recited in claim 6, wherein the side cell is accessed using a button.

8. A system for character selection, comprising:
  logic that provides a plurality of cells, each cell including a plurality of characters; and
  an input device having a plurality of controls, wherein the plurality of controls include a plurality of control buttons, each control button corresponding to a particular character of the plurality of characters within a cell,
  wherein the input device is capable of transmitting a first command to select a particular cell of the plurality of cells, the first command being initiated through a directional control of the input device that enables the selection of the particular cell, and wherein the input device is further capable of sending a second command using a control button to select a corresponding character of the plurality of characters within the selected cell, such that initiation of the control button causes the corresponding character to be selected;
  wherein the directional control is different from the control button.

9. A system as recited in claim 8, wherein a portion of the plurality of cells are arranged in a three by three grid.

10. A system as recited in claim 9, wherein a center cell of the three by three grid is selected prior to receiving the first command.

11. A system as recited in claim 10, wherein the first command indicates a move to a cell at most one cell away from the center cell.

12. A system as recited in claim 9, wherein the plurality of cells further includes at least one side cell, the side cell being outside the three by three grid, wherein the side cell is accessed using a button.

13. A system as recited in claim 8, further comprising logic that inserts an estimation extension after each character entered, the estimation extension including a plurality of characters that forms a word when combined with the characters previously entered.

14. A system as recited in claim 13, wherein the estimation extension is generated by examining a sorted list having a plurality of words sorted based on usage frequency.

15. A system as recited in claim 14, wherein the usage frequency refers to word occurrence frequency in selected articles.

16. A system as recited in claim 15, wherein the selected articles are related to a particular subject.

17. A computer program embodied on a computer readable medium for character selection, comprising:
  program instructions that provide a plurality of cells, wherein each cell includes a plurality of characters;
  program instructions that receive a first command to select a particular cell of the plurality of cells, the first command being initiated through a directional control that enables the selection of the particular cell; and
  program instructions that receive a second command to select a particular character of the plurality of characters within the selected cell, the second command being initiated by a specific button of a set of buttons, each of the set of buttons corresponding to specific ones of the plurality of characters within the selected cell so that the second command that is initiated by the specific button defines the selection of one character;
  whereby the directional control is different from the set of buttons.

18. A computer program as recited in claim 17, wherein the second command is received from the set of buttons of an input device, and the first command is received from a joystick of the input device, the joystick providing the directional control.

19. A computer program as recited in claim 17, wherein a portion of the plurality of cells are arranged in a three by three grid.

20. A computer program as recited in claim 19, further comprising program instructions that select a center cell of the three by three grid prior to receiving the first command.

21. A computer program as recited in claim 20, wherein the first command indicates a move to a cell at most one cell away from the center cell.

22. A computer program as recited in claim 19, wherein the plurality of cells further includes at least one side cell, the side cell being outside the three by three grid.

23. A computer program as recited in claim 22, wherein the side cell is accessed using a button.

24. A computer program as recited in claim 17, further comprising program instructions that insert an estimation extension after each character entered, the estimation extension including a plurality of characters that forms a word when combined with the characters previously entered.

25. A computer program as recited in claim 24, wherein the estimation extension is generated by examining a sorted list having a plurality of words sorted based on usage frequency.

26. A computer program as recited in claim 25, wherein the usage frequency refers to word occurrence frequency in selected articles.

27. A computer program as recited in claim 26, wherein the selected articles are related to a particular subject.

28. A system for enabling character selection, comprising:
a display screen, the display screen presenting a three-by-three grid of cells that includes the characters necessary for character selection, each cell of the three-by-three grid of cells including two or more characters;
an input device for providing commands that are executed and presented on the display screen, the input device including,
a directional control for enabling selection of one cell of the three-by-three grid of cells, the direction control initiating selection from a central starting position that is a center cell in the three-by-three grid of cells; and
a set of buttons, each of the set of buttons having an arrangement location that corresponds to an arrangement location of the two or more characters in a cell of the thee-by-three grid of cells, and selection of one of the set of buttons initiates selection of one character that is part of the cell;
whereby directional selection of any one of the cells in the three-by-three grid of cells is at most one cell away from a cell of the central starting position.

29. The system of claim 28, wherein the directional control is one of a joystick or second set of buttons, and the set of buttons are arranged in a set four, the set of four having a top button, a bottom button, a left button, and a right button.

30. The system of claim 28, wherein the three-by-three grid of cells includes one or more side cells.

31. The system of claim 30, wherein the characters necessary for character selection of a particular language are displayed within the three-by-three grid of cells or within three-by-three grid of cells plus the one or more side cells.

32. The system of claim 28, wherein the input device is a controller for interfacing with a computing device.

33. A method for character selection to compose one or more characters or words of a language, comprising the operations of:
(a) displaying a plurality of cells, each cell including a two or more characters and the plurality of cells containing a listing of characters for the language;
(b) enabling a first command to select a particular cell of the plurality of cells; and
(c) enabling a second command to select a particular character of the plurality of characters within the selected cell, the second command being initiated by a specific button that corresponds to the particular character within the selected cell; and
(d) repeating (b) and (c) until one or more characters or words of the language are input.

* * * * *